US005534856A

United States Patent [19]

Cadman

[11] Patent Number: 5,534,856

[45] Date of Patent: Jul. 9, 1996

[54] VEHICLE IDENTIFICATION AND VERIFICATION SYSTEM

[75] Inventor: Gary R. Cadman, Norwell, Mass.

[73] Assignee: Scully Signal Company, Wilmington, Mass.

[21] Appl. No.: 154,346

[22] Filed: Nov. 18, 1993

[51] Int. Cl.$^6$ .............................. G08B 21/00; G06F 7/04

[52] U.S. Cl. .............................. 340/825.340; 340/825.35; 340/649

[58] Field of Search .............................. 340/825.34, 825.35, 340/439, 649, 652, 931, 933, 941; 364/465, 424.04; 307/326; 361/42, 212, 215, 216, 220

[56] References Cited

U.S. PATENT DOCUMENTS 4,075,675 2/1978 Burkett et al. .............................. 340/652
4,901,195 2/1990 Stemporzewski, Jr. .............................. 361/217
5,159,523 10/1992 Claassen et al. .............................. 340/649
5,204,819 4/1993 Ryan .............................. 364/465
5,214,582 5/1993 Gray .............................. 364/425.03
5,249,129 9/1993 Lamoureux et al. .............................. 364/465

*Primary Examiner*—Thomas G. Black
*Assistant Examiner*—David Yink Jung
*Attorney, Agent, or Firm*—Bookstein & Kudirka

[57] ABSTRACT

A unique vehicle ID number and other verification information is stored in a small memory mounted on a tank truck. When the truck is connected to a loading terminal by means of a cable which is used by an existing overfill/ground system, an interface circuit connected between the memory and the cable prevents signals which are normally found on the cable leads from damaging the memory circuits. When information must be read from the memory, a special identification and verification system connected to the overfill/grounding circuits modifies some of the normal signals on the cable in order to activate the on-board memory and retrieve the stored information without disabling the overfill and ground proving capabilities.

31 Claims, 7 Drawing Sheets

VEHICLE IDENTIFICATION AND VERIFICATION SYSTEM

FIELD OF THE INVENTION

This invention relates generally to methods and apparatus for positively identifying a vehicle and, in particular, to vehicle identification methods and apparatus which utilize an on-board memory that can be interrogated by a remote controller over an electrical cable.

BACKGROUND OF THE INVENTION

Tanker trucks are commonly used for storing or transporting volatile or flammable materials, such as gasoline, diesel fuel or other petroleum products, which materials often produce large quantities of hazardous and toxic vapors that can pollute the environment. In order to preserve the quality of the atmosphere, such trucks are typically constructed with one or more sealed tanks that retain the vapors and prevent their escape. The sealed tanks are effective in retaining the vapors, but over time, the tanks can develop leaks that allow the vapors to escape.

In order to insure that the truck tanks are vapor "tight", by regulation, each of the tanks on a truck must be periodically subjected to inspections and tests and certified as vapor tight and leak-free. Such a certification is valid for a predetermined period of time, after which the certification expires, and the truck must be re-inspected. Recently, more stringent laws have been passed which require the vapor tightness certification of each truck to be checked and verified as valid each time the truck is to be filled and before filling actually commences.

One way of accomplishing this mandated verification is to track the certification manually. With this method, a plaque or identification (ID) label is permanently mounted on the truck, which ID label contains a serial number which is unique to the truck. Prior to a filling or loading operation, the serial number is observed by loading personnel and manually compared against a list of serial numbers assigned to trucks that have active or valid certifications. With such a manual system, a paper audit trail must be kept on each truck to verify that its certification has, in fact, been checked and verified prior to each loading.

While such a manual system is suitable for a very small operation involving only a few trucks and loading terminals, it involves a significant amount of paperwork to keep track of the truck certification data and quickly becomes cumbersome and inordinately time-consuming in large systems involving many trucks and busy loading terminals.

In an attempt to automate the verification process, some trucks have been fitted with special radio-frequency (RF) transponder plates. These plates respond to an RF signal generated by a transmitter located at the loading terminal and generate a low-power ID signal. This ID signal is detected and then used to identify the truck. A computer system uses the truck ID to retrieve information regarding the truck vapor tightness certification. The computer system uses the information to verify that the certification is valid before loading is allowed.

In some circumstances, these RF transponder systems work well, but the RF transmitter is relatively expensive. Further, the placement of the RF transponder plate on the vehicle is critical to produce a satisfactory response. Due to the expense and the placement difficulties, the RF transponder system is not widely used.

It is also possible to place a small memory on board the tanker truck which memory can store information about the truck, including a unique identifying number and other truck information. However, it is difficult to read the information from the memory using available equipment. More particularly, tanker trucks are typically filled by pumping equipment located at a loading rack or terminal. In order to prevent the truck tanks from overflowing doing the loading process, an overfill protection device is commonly used with each tank mounted on the truck to automatically disable the pumping equipment when the tank capacity limit has been reached. In addition, since the tanker trucks often carry flammable cargo, it is necessary to insure that the truck is properly grounded during the loading process so that no spark or electrical discharge will ignite the flammable or hazardous vapors that are created and this is typically done by using an automated ground proving system.

Overfill protection devices which are commonly on the market have a probe located within each tank that generates a fluctuating electrical signal when the fluid within the tank is less than a predetermined level. The probe is connected to an overfill circuit which is typically located on the loading terminal by an electrical cable which passes between the truck and the loading terminal. When the fluctuations in the probe signal cease, indicating a particular tank on the truck is filled, the overfill circuit operates to stop liquid flow into that tank by disabling the pumping equipment at the loading terminal. Such an overfill system and the probe used therewith is described in more detail in copending U.S. patent application, Ser. No. 08/076,809 entitled "Fail Safe Fluid Level Detection Circuit" filed on Jun. 14, 1993 by Arthur W. Shea and assigned to the same assignee as the present invention. The disclosure of the latter application is hereby incorporated by reference. Conventional ground proving systems also use the existing cable between the loading terminal and the tanker truck to carry electrical signals that verify the existence of a proper ground.

In order to use an on-board memory for vapor tightness certificate verification, it would be convenient to utilize the existing overfill/grounding system electrical cable to also transmit information to an on-board memory and receive information from the memory. However, in practice, this is difficult to do, because although the existing cable has multiple conductors, in many situations, all of the conductors are assigned to overfill or grounding signals and there are no free conductors. The cable may be relatively easily replaced in order to add additional conductors, but the connectors at the ends of the cable are not easily replaced and thus, the number of conductors is effectively fixed. Sharing of one or more conductors is possible, but the signals presently on the conductors are often inhospitable to the signals necessary for operation of an on-board memory.

For example, in order to make both the overfill protection system and the ground proving system "fail safe", it is common practice to use special signal arrangements on these circuits to prevent tampering and overriding of the circuits by placing shorts across the wiring. A common method of operating a ground proving system is to place a small alternating current signal on the ground lead which connects the truck to the loading terminal. At the truck end, the ground lead is connected to a ground bolt located on the truck which effectively connects the truck to the terminal and grounds the truck. The ground bolt contains a diode that rectifies the small alternating current signal and the rectified signal is sensed by a detection circuit at the loading terminal to verify that the vehicle has been properly grounded. The use of an alternating current signal guarantees that simply placing a short across the grounding wire in the cable that connects the loading terminal to the vehicle will not produce an indication that the truck is properly grounded. Such a grounding system is, for example, sold by the assignee of the present invention under the tradename "GROUNDHOG®" and is described in detail in U.S. Pat. No. 4,901,195, which patent is hereby incorporated by reference.

As described above, a similar fluctuating signal arrangement is used in existing overfill protection systems in order to prevent a simple short circuit or open circuit from erroneously masking an overfill situation. The presence of these fluctuating signals prevents proper operation and use of a conventional memory on board the truck. In the case of the aforementioned grounding system, the fluctuating signal may have an amplitude of between 10–50 volts and so the signal itself can damage conventional memory circuitry that generally has a maximum voltage rating of five volts.

Accordingly, it is an object of the present invention to provide a vehicle identification and verification system which can positively identify a vehicle.

It is another object of the present invention to provide a vehicle identification and verification system which can utilize an on board memory to store vehicle information, including unique identifying numbers, dates or other verification information.

It is still another object of the present invention to utilize existing overfill/grounding system cable connections between a loading terminal and a vehicle in order to identify the vehicle and retrieve information from the vehicle.

SUMMARY OF THE INVENTION

The foregoing objects are achieved and the foregoing problems are solved in one illustrative embodiment of the invention in which a unique vehicle ID number and other verification information is stored in a small memory mounted on the vehicle. When the vehicle is connected to a loading terminal by means of a cable which is used by the existing overfill/ground systems, an interface circuit connected between the memory and the cable prevents signals which are normally found on the cable leads from damaging the memory circuits. When information must be read from the memory, a special identification and verification system connected to the overfill/grounding circuits modifies some of the normal signals on the cable in order to activate the on board memory and retrieve the stored information without disabling the overfill and ground proving capabilities.

More particularly, using the identification and verification system, the unique ID number can be read from the vehicle memory over the overfill/grounding cable connection. The ID number can then be compared to a list of ID numbers stored in the identification and verification system which ID numbers correspond to trucks that have valid vapor tightness certifications. Using this comparison, a decision can be made whether or not to allow loading of the tanker truck. Alternatively, verification information, such as an expiration date of the particular truck vapor tightness certification can be retrieved from the on board memory and compared to the present date to make a determination whether to load the truck.

The interface circuit which connects the on board memory to the overfill/grounding cable is compatible with the existing overfill/grounding system signals so that the identification and verification system and the existing overfill/grounding system can be operated in parallel.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
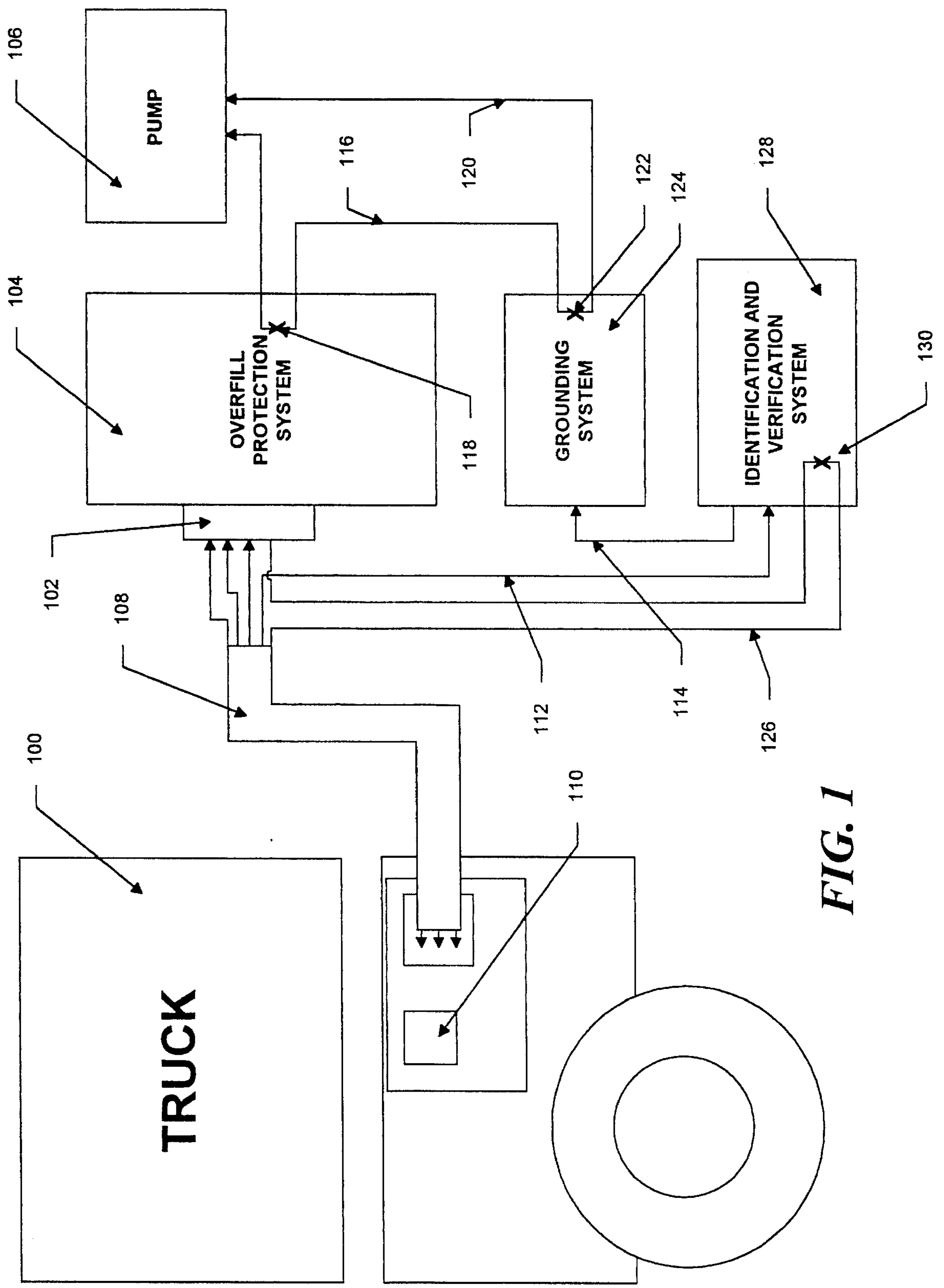
FIG. 1 is a block schematic diagram illustrating the main components of the inventive identification and verification system which are located in the vehicle and loading terminal.

FIG. 1 is a block schematic diagram showing a portion 100 of a tanker truck which is connected via a known cable 108 to a conventional overfill protection system 104 and a conventional grounding system 124. FIG. 1 illustrates the connection of the inventive identification and verification system 128 as a "retrofit" into the existing loading terminal electronic system.

More particularly, tanker truck 100 is connected to overfill system 104 and grounding system 124 by means of a multi-wire cable 108 which generally contains a wire for each overfill probe used with truck 100 and an additional wire (arbitrarily labelled as wire 112) that is used by the grounding system 124 to verify a proper ground connection. The overfill protection system 104 typically has a terminal block 102 to which individual wires of cable 108 are attached.

If the grounding system previously described is in use, truck 100 is also equipped with a grounding bolt containing a diode (not shown) and wire 112 is attached to this grounding bolt. Wire 112 then passes through cable 108 and would normally be attached to grounding system 124.

In order to control loading of the truck, overfill protection system 104 and grounding system 124 both contain internal electrical contacts, 118 and 122, which are controlled by fill relays. When the overfill protection system 104 detects that a particular tank is below the normal fill level and can accept additional fluid, the fill relay is operated to close the internal contact 118. Similarly, when the grounding system 124 detects that a proper ground has been established between truck 100 and the loading terminal, then its fill relay is operated and the internal contact 122 is closed. The electrical contacts 118 and 122 in overfill protection system 104 and grounding system 124 are connected in a series connection, comprising wires 116 and 120, to a pump 106 which delivers fluid to the truck 100. Thus, if either overfill protection system 104 or grounding system 124 detects an overfill condition or a ground fault, respectively, pump 106 will be prevented from operating.

In accordance with the invention, an identification and verification system 128 can be retrofitted or connected to the overfill protection system 104 and the grounding system 124. Identification and verification system 128 operates with a truck ID module 110 which is mounted on the truck. ID module 110 is connected to the lead 112 which is normally used for the grounding system connection and comprises an interface circuit and a memory. If a ground bolt containing a diode is present on truck 100, the truck ID module 110 is electrically connected in parallel with the existing ground bolt diode.

In order to connect the identification and verification system into the existing loading terminal circuitry, at the terminal end, wire 112, which is normally connected to grounding system 124, is instead connected to identification and verification system 128 and a separate connection 114 is run between identification and verification system 128 and grounding system 124. Identification and verification system 128 then monitors the ground connection between the loading rack and the truck 100 and the status of the ground connection is transferred via wire 114 to the grounding system 124.

In addition, one of the leads from the tank probes which normally is connected to the terminal block 102 of overfill protection system 104 is instead diverted to the identification and verification system 128. For example, lead 126 from a tank probe is connected through a relay contact 130 in identification and verification system 128 to the terminal block 102 as shown in FIG. 1. This connection allows the identification and verification system 128 to indirectly control the loading process of truck 100. For example, if identification and verification system 128 determines, in a manner that will hereinafter be described in detail, that the truck ID number stored in truck ID module 110 represents a truck with an expired vapor tightness certification or is not authorized for loading, then identification and verification system 128 may disable loading of the truck 100 by opening contact 130. The open contact simulates an overfill condition in truck 100 and causes overfill protection system 104 to release its fill relay, in turn, opening the contact 118 and the circuit to pump 106 and preventing any loading of truck 100.

One of the aforementioned problems with the connection shown in FIG. 1 is that the truck ID module 110 comprises circuitry, including memory circuits, which are sensitive to overvoltage conditions. In particular, conventional commercial memory circuits require approximately 5 volts DC to operate properly whereas a typical grounding circuit 124 places an AC signal on lead 112 which is on the order of 20 to 100 volts peak to peak. Consequently, if no other precautions were taken, the normal grounding system voltages would be likely to damage truck ID module 110.

When an identification and verification system 128 is added into the system as shown in FIG. 1, the lead 112 normally connected to the grounding system 124 is now connected to the identification and verification system 128, and this system places a 5 volt signal on lead 112. Consequently, truck ID module 110 can directly operate from this system. However, as truck 100 may load from different terminals there is no way of knowing whether the grounding system 124 will be present by itself, the identification and verification system 128 will be present or whether both systems will, in fact, be present at any given loading terminal. Consequently, it is necessary to protect the truck ID module 110 from overvoltage conditions while allowing the grounding system to operate properly. This protection is accomplished by the interface circuitry shown schematically in FIG. 2.

Figure 2:
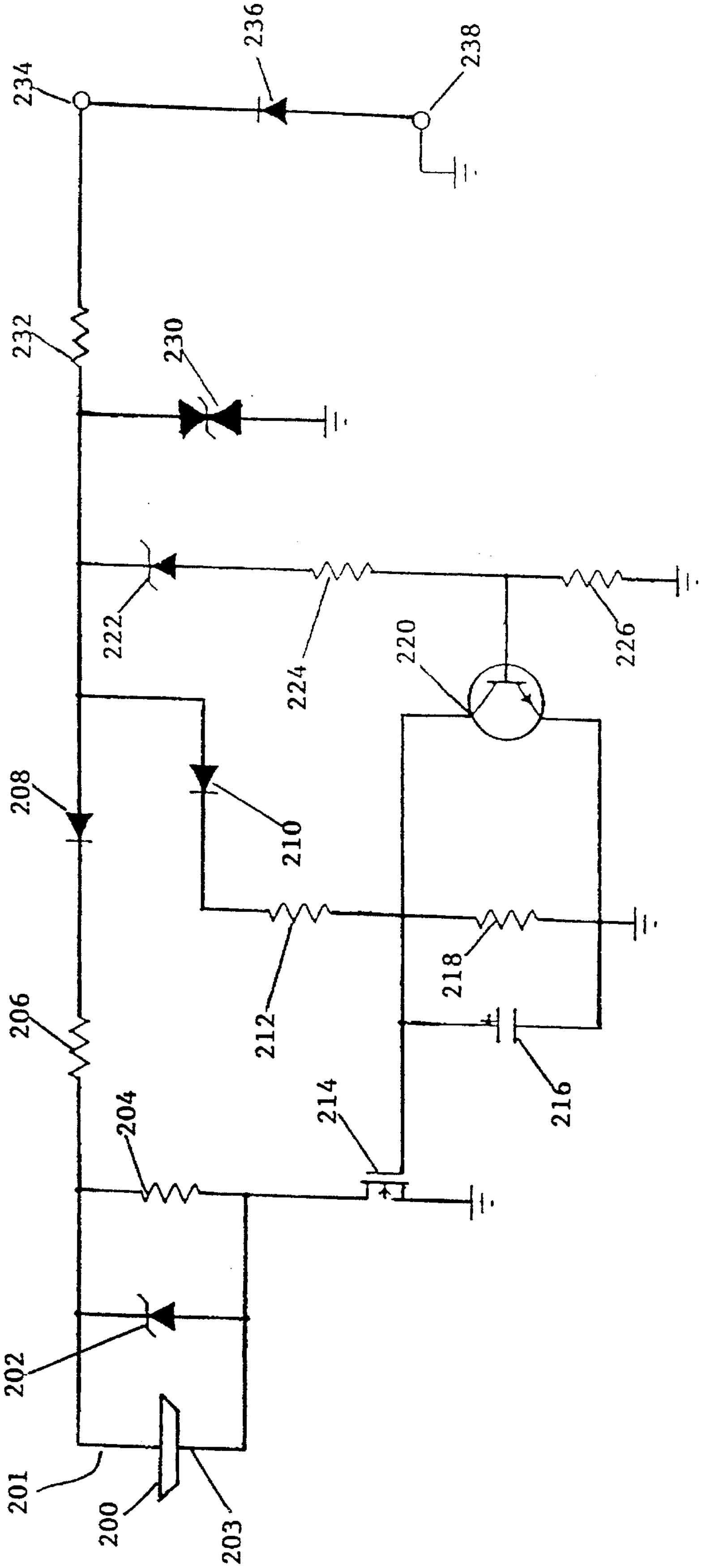
FIG. 2 is a block schematic diagram of the interface circuitry located on the vehicle.

FIG. 2 illustrates circuitry which comprises the truck ID module 110 shown in FIG. 1. In particular, the circuitry of FIG. 2 connects, via terminals 234 and 238, across the conventional ground bolt (the diode normally found in the ground bolt is illustrated as diode 236). Terminal 234 is normally connected to the ground bolt lead (lead 112 in FIG. 1) and the remaining terminal of the circuitry, terminal 238, is normally connected to ground.

The purpose of the interface circuit in FIG. 2 shown is to protect the memory circuit 200 from overvoltage conditions while allowing the grounding circuitry to operate properly. Terminal 234 is connected, via resistor 232, to the cathode of bidirectional Zener diode 230 which protects against over voltage conditions, the partially regulated voltage is provided to diodes 208 and 210 which act as rectifying diodes and prevent the negative portions of the alternating signal normally present on the ground verifying line from damaging the components.

The rectified signal generated by diode 208 is applied, via resistor 206, to the memory module 200 which stores the on board information. Memory module 200 contains a small electrically-programmable ROM memory containing a unique serial number or vehicle ID number. In addition, memory module 200 may contain a non-volatile RAM memory which can store additional truck information such as vehicle weight, capacity or the expiration date of the vehicle's vapor tightness certification. Although only one memory module is shown in FIG. 2, additional memories or modules can be added in parallel for additional memory capacity.

Memory module 200 can be read by clocking information serially into the power/input port 201. The memory module 200 becomes operational when the remaining lead, 203, is connected to ground via FET 214 as will hereinafter be explained. A Zener diode 202 is connected across memory module 200 to prevent an overvoltage condition across the memory from damaging it.

A variety of commercial memory modules may be used for module 200, and a memory module which is suitable for use with the present invention is a model DS1992 TOUCH MEMORY® chip manufactured by Dallas Semiconductor Corporation, 4401 South Beltwood Parkway, Dallas, Tex. 75244. This module consists of a memory chip housed in a stainless-steel enclosure. The chip uses CMOS technology and thus consumes only leakage current when in an idle state. The chip contains a small ROM memory and a small RAM memory arranged in a file structure similar to that found on a floppy disk (the file structure is described in more detail below). The ROM area of the chip includes a serial number is permanently laser-etched into the chip and uniquely identifies the chip. This serial number is permanently encoded along with a cyclic redundancy check (CRC) code. The code can be used to verify that the serial number has been read correctly.

Communication to the memory device is bi-directional and utilizes a special one-wire protocol. More particularly, the communication is performed serially bit-by-bit in a half-duplex mode within discretely-defined time slots. The memory device is always operated under control of a microcontroller located in the loading terminal. The microcontroller generates the time slots during which information transfer takes place. The communication protocol is described in detail in a product reference book entitled "DS199X TOUCH MEMORY Standards, Edition 1", printed in Oct. 1992 by Dallas Semiconductor Corporation, Dallas, Tex., which reference book is hereby incorporated by reference in its entirety.

As previously mentioned, memory module 200 may be selectively activated by connecting its ground lead 203 to ground via FET transistor 214 which is used to disconnect module 200 in the case of an overvoltage condition. FET transistor 214 is, in turn, controlled by the circuit consisting of diode 210, resistor 212, capacitor 216, resistor 218 and transistor 220. This latter circuit selectively turns off FET transistor 214 when an overvoltage condition is sensed by the circuit comprising Zener diode 222 and resistors 224 and 226.

More particularly, the interface circuit shown in FIG. 2 can be described most easily by considering its operation during the two conditions under which the circuit functions. The first condition occurs where the inventive identification and verification system (128 in FIG. 1) has been attached at the loading terminal. As will be herein after described, the identification and verification system sequentially applies both positive 5 volt and negative 5 volt signals to lead 112 which signals are applied to terminal 234 in order to test for the presence of a grounding system diode. Bidirectional Zener diode 230 is used for static electricity protection and is selected to have a breakdown voltage which is higher than any of the voltages which are normally expected in the system, in particular, the maximum 50 volt signal which can be generated by the grounding system (illustratively, Zener diode 230 is a 60-volt Zener diode) and, consequently, diode 230 will not enter its breakdown region in the presence of the 5 volt signals. Resistor 232 is a limiting resistor which limits the current running through Zener diode 230 in the case where an overvoltage signal is applied to the circuitry and Zener diode 230 breaks down and conducts current.

As previously mentioned, the negative 5 volt signal is blocked by diodes 208 and 210 whereas the positive 5 volt signal will be applied, via diode 208, to the resistive divider consisting of resistors of 206 and 204. This divider, and the associated Zener diode 202, limits the maximum voltage which can be applied to memory module 200 in the case of an overvoltage condition where Zener diode 230 limits the voltage.

The divided voltage produced by this latter divider is applied to the memory module 200. In addition, the positive 5 volt signal will be applied, via diode 210, to resistor 212 in order to charge capacitor 216. Resistor 212 is selected to have a sufficiently high value that the circuit does not excessively load the grounding diode 236 and prevent the grounding system from operating in those cases where no identification and verification system is present. At this time transistor 220 is in an "off" condition, and, in particular transistor 220 is held in the "off" condition by resistor 226. Illustratively, Zener diode 222 is selected so that it does not breakdown under the applied positive 5 volt signal and thus does not change the state of transistor 220.

Eventually, capacitor 216 charges, via diode 210 and resistor 212, to the point where FET transistor 214 turns "on". When FET transistor 214 turns "on", the ground lead 203 of memory 200 is connected to ground so that the memory unit 200 becomes operational. Resistor 218 is provided to discharge capacitor 216 when voltage is removed from the circuit.

A second condition occurs where the interface circuit of FIG. 2 is connected to a loading terminal where the inventive identification and verification system 128 is not present. In this case, the existing grounding system places a 10–50 volt alternating signal on terminal 234 in order to test for the presence of a ground bolt with a diode (such as diode 236 which schematically represents a diode in a ground bolt. In accordance with the normal operation of the grounding system, the alternating signal is rectified by diode 236 and the rectified signal is detected by the grounding system to detect the proper ground connection. If the identification and verification system 128 is not present, the memory 200 is superfluous, however, the interface circuit is designed to prevent damage to the memory 200 under all operating conditions so that the vehicle can be connected to a conventional grounding system and still operate properly.

More particularly, as previously mentioned, diodes 208 and 210 effectively rectify the applied voltage, and, thus, the negative cycles do not affect the memory 200. The positive cycles are applied to Zener diode 222 which is selected to break down when a voltage above approximately five volts is applied (illustratively, Zener diode 222 is an 7.5 volt diode). Consequently, Zener diode 222 applies a voltage to resistor 224 and transistor 220 turns "on". Resistor 224 is selected to have a sufficiently high value that it does not load the ground bolt diode 236. "On" transistor 220 shorts capacitor 216 and, consequently, capacitor 216 does not charge through diode 210 and resistor 212 as in the previous case.

Since capacitor 216 does not charge, FET transistor 214 remains in its "off" condition. Thus, ground lead 203 of memory 202 is not connected to ground but instead held to the potential of input lead 201 via resistor 204. Consequently, the applied 10–50 volt signal does not affect memory 200 since it essentially floats at the input voltage level and, in addition, memory 200 does not load the grounding diode 236.

Figure 3:
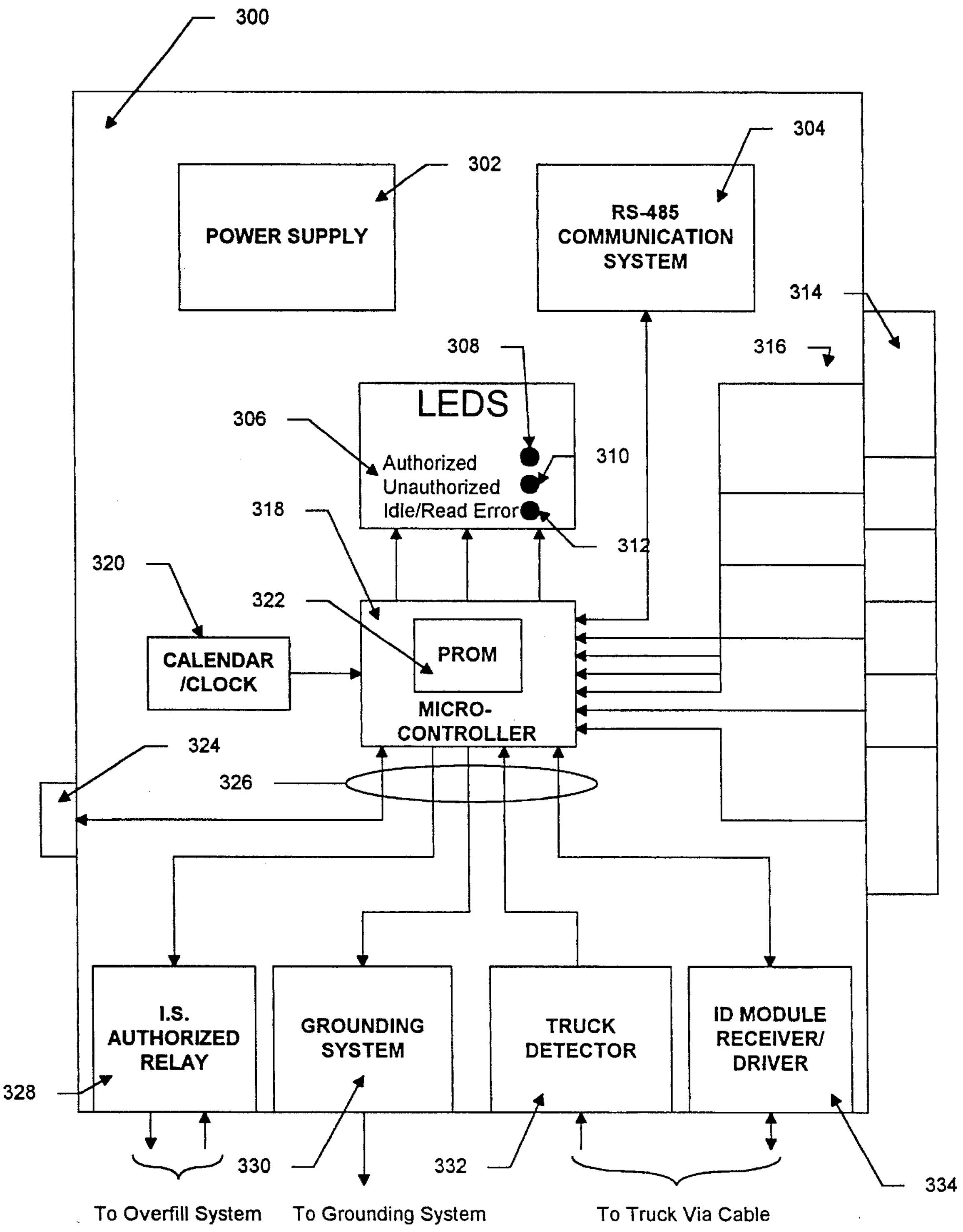
FIG. 3 is a more detailed block schematic diagram of the identification and verification circuitry located in the loading terminal.

FIG. 3 is a more detailed block diagram of the terminal portion of the inventive identification and verification system 128. As shown in FIG. 3, the identification and verification system 300 consists of a several main components including power supply 302, communication subsystem 304, microcontroller 318, clock 320 and interface units 328, 330, 332 and 334.

Microcontroller 318 is a conventional microcontroller which operates and is programmed in a well-known manner. Controller 318 may illustratively consist of a model 68HC11F1 manufactured by Motorola Semiconductor Products, Inc. located in Phoenix, Ariz. As is conventional, this microcontroller has a plurality of address leads, data leads and signal ports and the actual connections of the microcontroller and the method for programming it are well-known to those skilled in the art and form no part of the present invention. Microcontroller 318 contains an electrically erasable PROM 322 which can be used to store a list of valid truck ID numbers or other identification information.

Microcontroller 318 is connected to an RS-485 communication system shown schematically as block 304. In general, the communication system 304 is a conventional system and allows communication over a network connection (not shown) to a remote computer. The communication subsystem allows information to be transferred into and out of microcontroller 318, and, in particular, PROM 322. For example, PROM 322 may be loaded with a list of truck ID numbers corresponding to trucks which have a valid vapor tightness certificate from a remote computer. A centralized operation of this type would allow the certification of the trucks operating in a local area to be verified by simply comparing the truck ID number of each truck to the stored list when the truck is attached to the loading system.

It is also possible that a remote computer could use the inventive identification and verification system as merely a remote "reader" system. In this latter case, the truck ID number read from the truck ID module 110 would be passed directly to the remote computer, via the communication system 304, for processing at the remote computer. Based on the results of this processing, the remote computer can control the pump 106 directly in a known fashion. This latter type of operation allows additional control over the system by the remote computer. For example, the remote computer can use additional criteria, such as the truck owner's outstanding credit balance, to make a decision as to whether the truck should be loaded.

Alternatively, microcontroller 318 may be provided with a real time clock 320 which generates the current date and time. When such a clock is used, the expiration date of the truck vapor tightness certification is stored in the on-board memory portion of truck ID module. The stored date and time is then retrieved and checked against the date and time generated by clock 320 to determine whether the certification is still valid.

Microcontroller 318 may also be programmed by applying appropriate jumpers to a jumper block 314 which is, in turn, connected by means of signal leads 316 to various ports to controller 318. Illustratively, the jumpers on jumper block 314 may be used to set various parameters, such as operating parameters and communication parameters used by communications subsystem 304, such as baud rate, parity, data bits and various tests.

Microcontroller 318 can also control an LED display 306 which illustratively contains at least three light-emitting diodes or other display devices 308–312. As will be hereinafter explained, the "authorized" diode 308 is illuminated to indicate that the loading process has been authorized. This illumination occurs when the identification and verification system has determined that a truck is connected to the system and has verified that the attached truck has a valid vapor tightness certification. Alternatively, microcontroller 318 can illuminate the "unauthorized" LED 310. This action indicates that a truck has been identified, but has been found to have an expired vapor tightness certification. The remaining "idle/read error" LED 312 is illuminated when no truck is attached or when the system cannot read the truck ID module for various reasons.

Microcontroller 318 may further control, via leads 326, a plurality of interface units which allow the identification and verification system to interact with the various systems of the loading terminal as illustrated in FIG. 1. In particular, microcontroller 318 can operate the IS Authorized relay 328. This relay controls the electrical contact 130 shown in FIG. 1 which is connected in series with one of the probe wires. The IS Authorized relay is operated when the microcontroller 318 determines that a connected truck has a valid vapor tightness certification.

Microcontroller 318 may also interact with grounding system 124 via interface 330. In particular, the output of one of the microcontroller ports of microcontroller 318 is provided, via interface 330, to the grounding system 124 (the connection is illustrated as lead 114 in FIG. 1). When microcontroller 318 successfully detects a proper ground connection as will hereinafter be described in detail, a signal is applied from the controller 300 to the grounding system 124 which signal mimics the rectified signal generated by the ground bolt diode in an attached truck. This mimicking signal allows the controller 300 to operate with a standard grounding system 124.

Microcontroller 318 also receives inputs from interfaces 332 and 334. In particular, interface 332 is a truck detector interface which receives a signal from one of the overfill probes. The truck detector circuit is a conventional circuit which monitors this probe signal to detect a fluctuating signal which indicates that non-filled truck has been connected to the system.

Finally, microcontroller 318 can interact with the ID module receiver/driver 334 which module generates the pulses and the timing sequences necessary to read information from the truck ID module. As previously mentioned, the specific timing sequences do not form a part of the present invention and are dependent on the particular memory module used in the truck ID module. The signals read out of the truck ID memory are provided to microcontroller 318.

A special by-pass memory reader 324 is also provided. This allows a preprogrammed memory to be provided to a truck operator in certain circumstances, for example, when a new truck must be operated before module installation. In this case, the operator is provided with a memory module of the type that is mounted on the truck. This latter module may be programmed with an expiration date and time that is for example, twenty-four hours in the future. When this preprogrammed memory is placed against reader 324, the date and time programmed into the memory can be read by microcontroller 318. The date and time so read allow the truck to be loaded for a short time duration until the module is installed.

Figure 4:
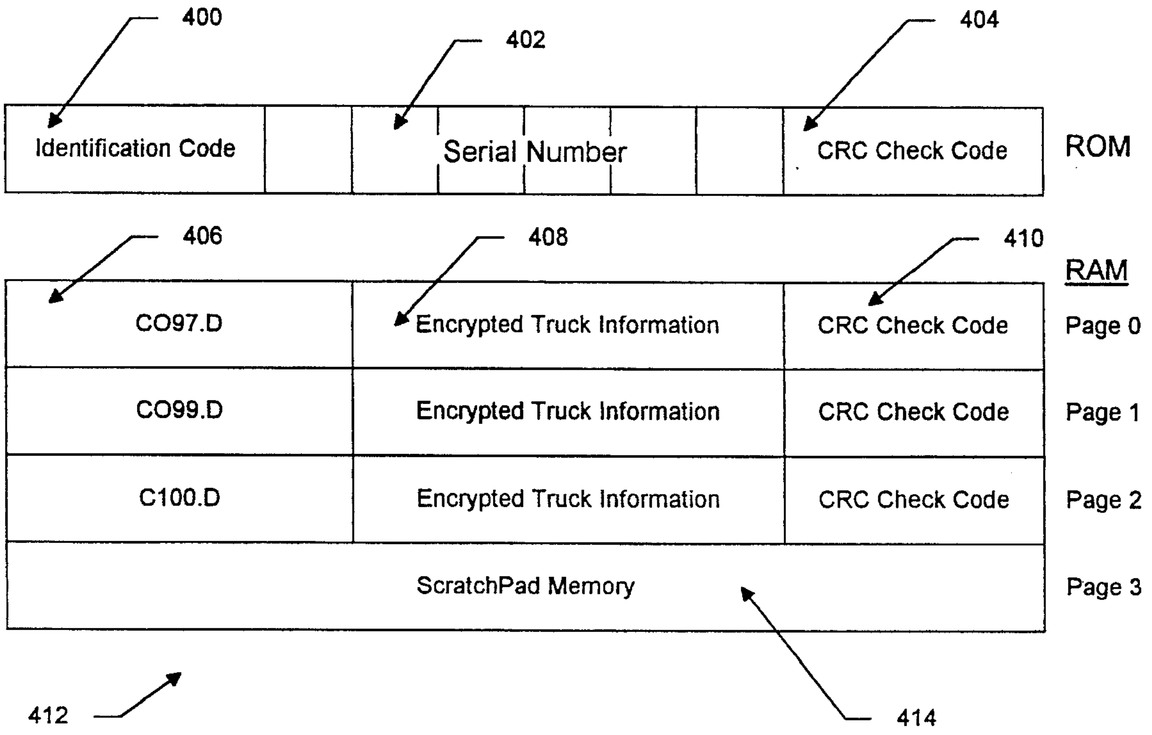
FIG. 4 is a schematic diagram of the on board memory organization.

FIG. 4 shows an illustrative organization of the truck ID memory module 110 (FIG. 1). In particular, the memory module 412 comprises a ROM section which stores an identifying code 400, a serial number 402 and a check code 404, all of which are permanently etched into the memory chip. The identifying code is specific to the particular memory device and indicates the type of device. The serial number is unique to each memory chip. Thus, when a memory module is place on a truck, the truck is uniquely identified by the serial number.

As previously mentioned, the ROM portion of the memory chip can be read out of the chip by applying an appropriate command sequence. The identification code 400, the serial number 402 and the check code 404 are then read out of the ROM memory portion. The data contained in the identification code 400 and the serial number 402 is then used to compute an new check code and this computed code is compared against the check code 404 read from the memory. If the two check codes are equal, it is assumed that the read operation has been successful.

The remainder of the memory 412 is organized as a multi-page RAM where each page memory portion can be individually addressed by applying a unique file name and an appropriate command to the memory. For example, page 0 can be addressed by transmitting the file name "CO97.D", shown as file name 406, to the memory. Entry of the file name 406 allows the remaining RAM sections 408 and 410 containing additional truck information and another CRC check code, respectively, to be accessed. Truck information section 408 may, for example, contain information regarding the size and weight of the truck and the expiration date of the vapor tightness certification. For security purposes, the information in section 408 may be encrypted using any of a variety of well-known encryption techniques, for example DES encoding. Illustratively, this encoding might be performed using a concatenation of the stored serial number and an additional password as the key (the file name is not encoded).

The presence of a unique file name and a password allows a single truck ID module to be used with several different companies; each company would have its own file name and password and thus be able to access only the truck information with which it is concerned. Consequently, in the memory arrangement illustrated in FIG. 4, three separate companies could store truck information on the same truck.

In addition, a scratchpad memory 414 is provided so that data to be entered into the memory 412 can first be entered into the scratch memory and checked before it is finally entered into the RAM memory. It should be noted that the data memory organization shown in FIG. 4 is for illustrative purposes only. Different memory devices will have different memory organizations which can be used interchangeably in accordance with the principles of the present invention.

Figure 5:
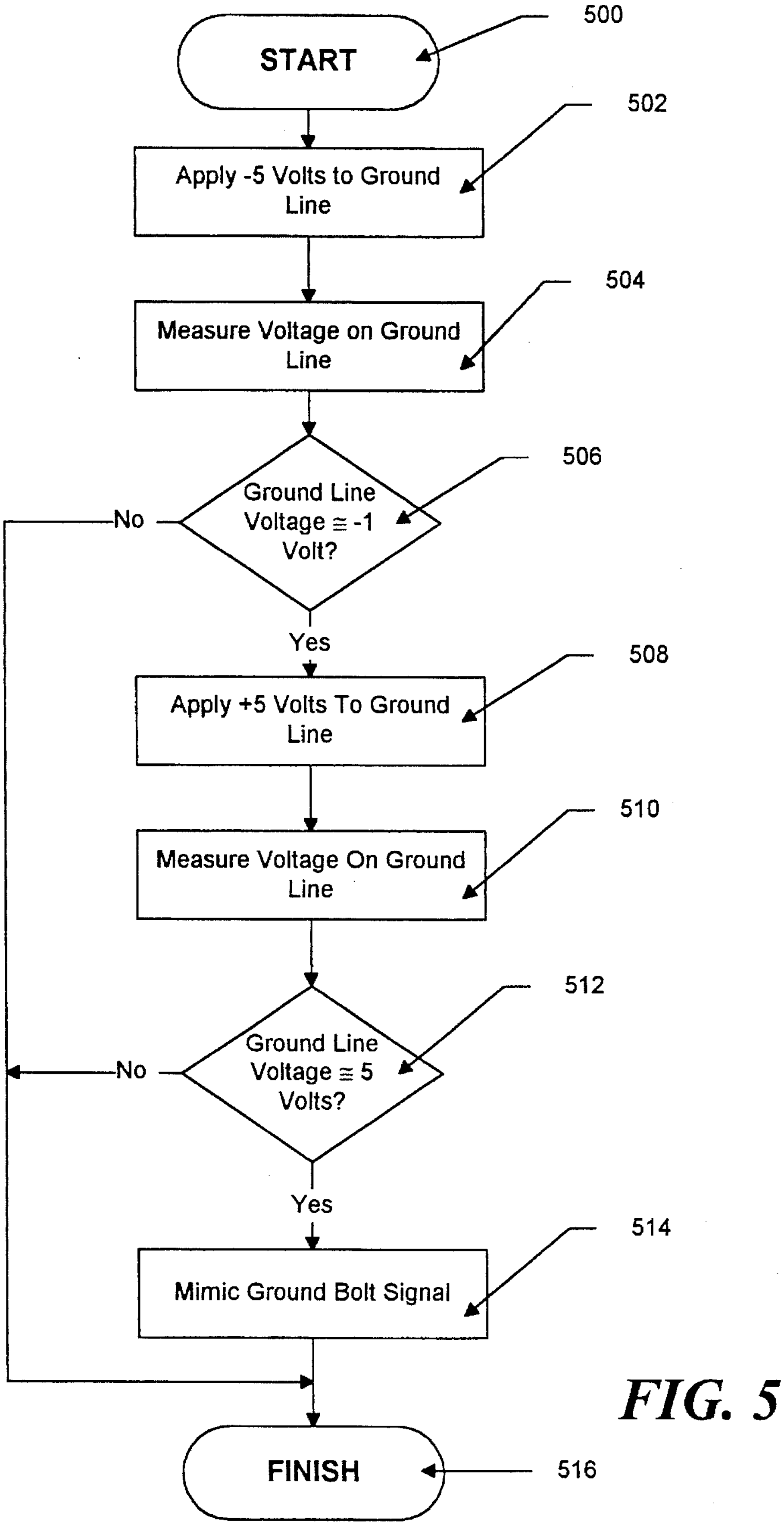
FIG. 5 is an illustrative flow chart of the steps which are performed by the identification and verification system to verify that the attached vehicle is properly grounded.

An illustrative routine which the identification and verification system uses to test for the presence of a proper ground is shown in FIG. 5. The routine starts in step 500 and proceeds to step 502 where a current-limited, negative 5 volt signal is applied to the ground test line (referring to FIG. 1 the ground test line corresponds to line 112). As previously mentioned, line 112 is normally attached to a ground bolt on the truck which connects the ground line through a diode to the actual truck ground (this connection is schematically illustrated as diode 236 in FIG. 2). Thus, the negative 5 volt signal placed on line 112 will forward bias the grounding diode if such a diode is present. Consequently, in step 504, the identification and verification system measures the voltage on the ground line. As illustrated in step 506, a ground line voltage of approximately negative 1 volt is an indication that the forward-biased ground diode is present. If the proper voltage is not present, the routine proceeds to finish in step 516 since either no truck or no diode is present at the end of the grounding line.

Alternatively, if, in step 506, the ground line voltage is approximately negative 1 volt, the identification and verification system proceeds, in step 508, to apply a positive 5 volt signal to the ground line and, in step 510, the voltage on the ground line is again measured. If a diode is present in this case, the diode will become reverse-biased and present a high impedance. Therefore, in step 512, the ground line voltage will rise approximately to 5 volts. If the voltage does not reach the 5 volt magnitude, the routine finishes in step 516.

If, alternatively, in step 512, a voltage of approximately of 5 volts is present on the ground line then, in step 514, the identification and verification system applies a voltage to the grounding system (over lead 114 in FIG. 1) to mimic the voltage that would be present if the grounding system directly tested the grounding system. The routine then finishes in step 516.

Figure 6A:
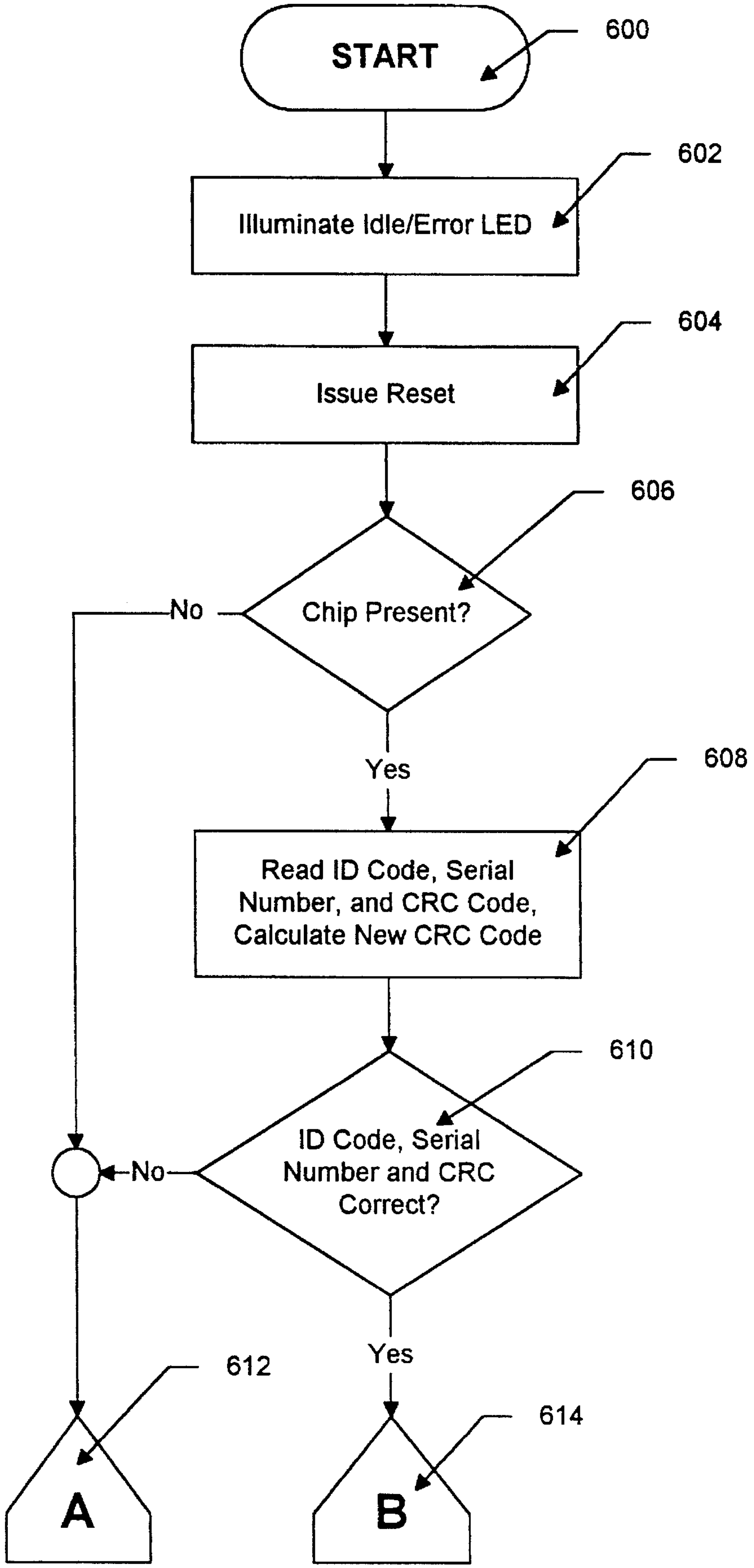
FIGS. 6A and 6B, when placed together, comprise an illustrative flow chart of the steps which are performed by the identification and verification system to identify the attached vehicle and verify that the vapor tightness certificate is unexpired prior to loading.
Figure 6B:
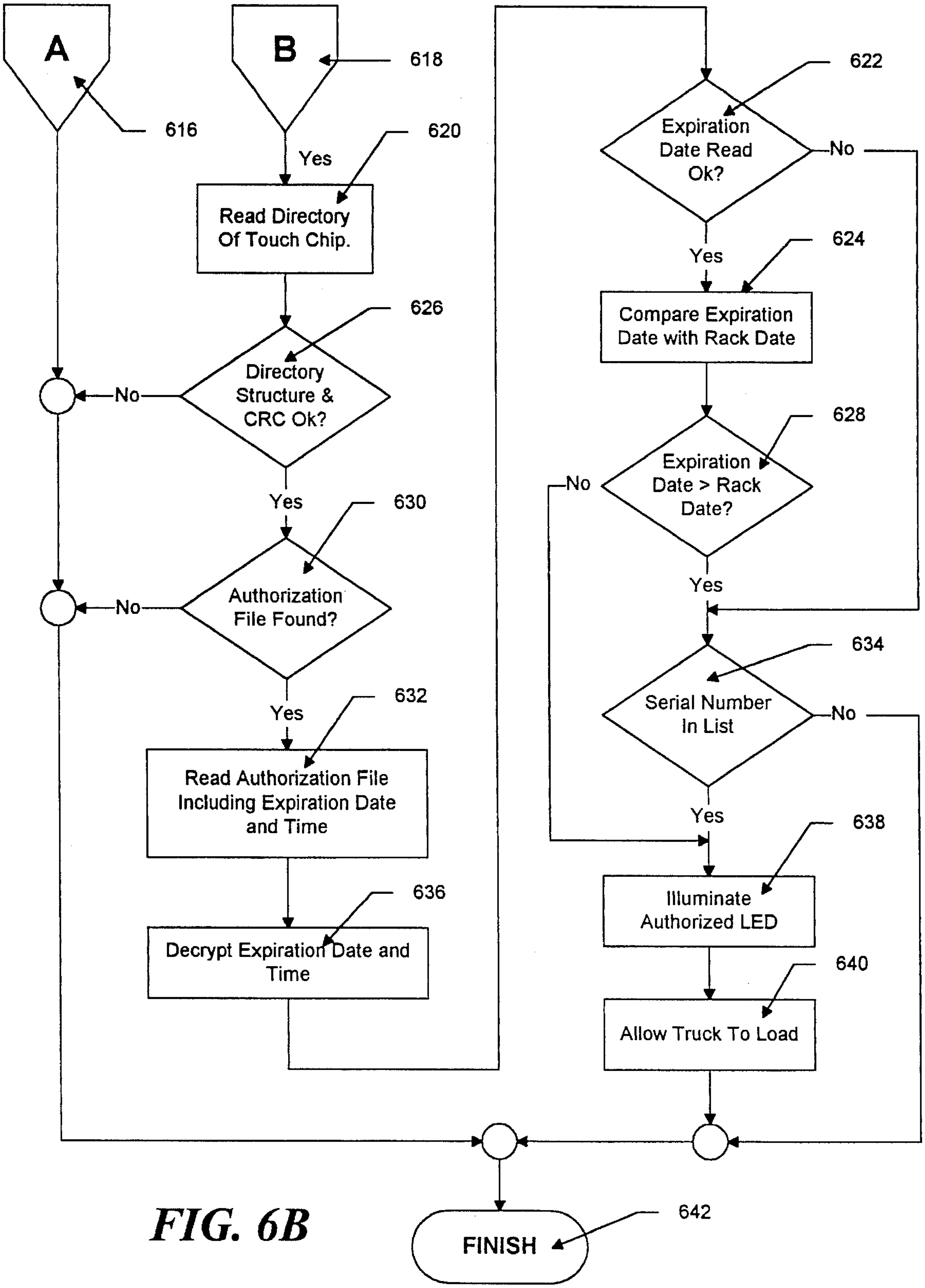

FIGS. 6A and 6B, when placed together, show an illustrative method by which the inventive system checks an on-board ID memory module in order to determine whether a truck should be loaded or not. The illustrative routine starts in step 600 and proceeds to 602 where the idle/error LED is illuminated to indicate that the identification and verification system is in an "idle" state.

In step 604, a reset command is issued and, in the case of the particular memory chip discussed above, the reset command causes the memory chip to return a "chip present" signal to the identification and verification system.

In step 606, the chip present signal is checked to determine whether, in fact, a memory chip is present. If not, the routine proceeds, via off-page connectors 612 and 616, to finish in step 642. Alternatively, if, in step 606, it is determined that a memory chip is present, the routine proceeds to step 608 in which the ID code, serial number and CRC check code are read from the ROM section of the chip. Using the ID code and serial number information, a new CRC code is calculated and, in step 610, the newly-calculated CRC code is used to determine whether the ID code, serial number and CRC have been read correctly. If not, the routine proceeds, via off-page connectors 612 and 616, to finish in step 642.

Alternatively, if the ID code and serial number are correct, then the routine proceeds, via off-page connectors 614 and 618, to step 620. In step 620, the file name directory of the memory chip is read from the chip and, in step 626, the directory structure and CRC check code of the file name is checked to make sure that the preceding read operation proceeded correctly. If the directory structure and the CRC check code is determined to be defective, then the routine ends step 642.

If, in step 626, the directory structure and CRC check code are in proper form, the routine proceeds to step 630 to check whether a truck information file is present and can be read. If a truck information file is not found or is defective, the routine finishes in step 642. Alternatively, if a truck information file is found, it is read using the file name assigned to a particular client in step 632 and the encrypted expiration date and time, if present, are obtained. In step 636, the expiration date and time are decrypted using a conventional decrypting routine corresponding to the encrypting scheme used to encrypt the data. The routine then proceeds to step 622.

In step 622 the expiration date is checked to be sure that it is in correct format. If not, the routine proceeds to step 634 where the serial number is checked as discussed below. Alternatively, if, in step 622, the expiration date has been read correctly, the routine proceeds to step 624 in which the expiration date and time is compared to the date and time generated by calendar clock 320.

The result of that comparison in step 628 is used to determine whether truck should be allowed to load; in particular, if the expiration date read from the on-board truck ID memory module is later than the date produced by calendar/clock 320, then the routine proceeds to step 638 where the authorized LED is illuminated and the truck is allowed to load in step 640. The routine then finishes in step 642.

Alternatively, if, in step 622, it is determined that the expiration date read is not proper, or the expiration date is greater than the stored expiration date as determined in step 628, the routine proceeds to step 634 to check whether the serial number obtained from the on-board truck ID memory module is present in list of authorized serial numbers stored in the microcontroller PROM. This latter check can be used to override the stored expiration dates in some cases.

If the serial number of the truck is present in the list, then, in step 638, the authorized LED is illuminated and the truck is allowed to load in step 640. Alternatively, if, in step 634, the serial number is not present in the loading terminal list, then the routine finishes in step 642.

What is claimed is:

1. A vehicle identification system including a vehicle apparatus and a monitoring terminal apparatus and being for use with a monitoring system having a wire for electrically connecting the vehicle to a monitoring terminal, the monitoring system, when said monitoring terminal apparatus is not present, generating monitoring signals on the wire, the identification system comprising:

a memory mounted on the vehicle containing unique identifying information;

identification apparatus comprised by the monitoring terminal apparatus and connected between the monitoring terminal and the wire for generating identification signals and outputting them on the wire; and interface apparatus connected between the wire and the memory, the interface apparatus, when the monitoring terminal apparatus is not present, being responsive to the monitoring signals for isolating the memory from the monitoring signals, and the interface apparatus, when the monitoring terminal apparatus is present, being responsive to the identification signals for allowing the memory to receive the identification signals.

2. A vehicle identification system according to claim 1 wherein the memory responds to the identification signals by outputting the identifying information on the wire.

3. A vehicle identification system according to claim 1 wherein the monitoring system comprises a sensor mounted on the vehicle which is responsive to the monitoring signals and which outputs a vehicle condition signal on the wire and wherein the sensor is also responsive to the identification signals to output said vehicle condition on the wire in response thereto.

4. A vehicle identification system according to claim 1 wherein the memory contains verification information pertaining to the vehicle in addition to the identification information and the memory is responsive to read signals generated by the identification system subsequent to the identification signals for returning the verification information to the identification system.

5. A vehicle identification system according to claim 4 wherein the verification information can be changed by the identification system.

6. A vehicle identification system according to claim 1 wherein the interface circuit is responsive to the monitoring signals for disconnecting the memory from the wire.

7. A vehicle identification system according to claim 1 wherein the interface circuit is responsive to the identification signals for connecting the memory to the wire.

8. A vehicle identification system according to claim 1 wherein the identification information is permanently stored in the memory.

9. A vehicle identification and verification system including a vehicle apparatus and a monitoring terminal apparatus and being for use with an overfill and grounding system having a multiwire cable for electrically connecting the vehicle to an overfill and ground monitoring terminal, the over fill and grounding system, when the monitoring terminal apparatus is not present, generating monitoring signals on the cable wires, the identification and verification system comprising:

a memory mounted on the vehicle containing a unique serial number;

identification apparatus comprised by the monitoring terminal apparatus and connected between the overfill and ground monitoring terminal and the cable for generating identification signals and for generating modified monitoring signals; and interface apparatus connected between the cable and the memory, the interface apparatus, when the monitoring terminal apparatus is not present, being responsive to the monitoring signals for isolating the memory from the monitoring signals, the interface apparatus, when the monitoring terminal apparatus is present, being responsive to the modified monitoring signals for connecting the memory to the cable to receive the identification signals.

10. A vehicle identification and verification system according to claim 9 wherein the memory is responsive to the identification signals for providing the serial number to the identification system.

11. A vehicle identification and verification system according to claim 10 wherein the overfill and ground monitoring system comprises a ground sensor mounted on the vehicle which, when the monitoring terminal apparatus is not present, is responsive to the ground monitoring signals for returning a first ground signal indicating that the vehicle is grounded to the monitoring terminal, and wherein the ground sensor, when the monitoring terminal apparatus is present, is responsive to the identification signals for returning a second ground signal indicating that the vehicle is grounded to the monitoring terminal.

12. A vehicle identification and verification system according to claim 11 wherein the identification system is responsive to the second ground signal for providing a simulated first ground signal to the overfill and grounding system.

13. A vehicle identification and verification system according to claim 9 wherein the memory comprises a read-only portion and a random access portion and wherein the serial number is permanently stored in the memory read-only portion.

14. A vehicle identification and verification system according to claim 13 wherein the memory contains verification information pertaining to the vehicle stored in the memory random access portion and the memory is responsive to read signals generated by the identification system subsequent to the identification signals for returning the verification information to the identification system.

15. A vehicle identification and verification system according to claim 9 wherein the memory is connected between one of the cable wires and ground and wherein the interface circuit is responsive to the monitoring signals for disconnecting the memory from ground.

16. A vehicle identification and verification system according to claim 15 wherein the interface circuit is responsive to the identification signals for connecting the memory to ground.

17. A tank truck vapor tightness certification verification system including a vehicle apparatus and a monitoring terminal apparatus and being for use with an overfill and grounding system having a multiwire cable for electrically connecting the tank truck to an overfill and ground monitoring terminal, the overfill and grounding system, when the monitoring terminal apparatus is not present, generating fluctuating overfill protection and ground proving signals on the cable wires, the verification system comprising:

a memory mounted on the vehicle and containing a unique serial number, the memory being connected to one of the cable wires;

identification apparatus connected between the overfill and ground monitoring terminal and the cable for generating memory read signals and for generating modified ground proving signals; and interface apparatus connected between the cable and the memory and responsive to the modified ground proving signals for connecting the memory to ground, said interface apparatus, when the monitoring terminal apparatus is not present, being responsive to the ground proving signals for disconnecting the memory from ground.

18. A tank truck vapor tightness certification verification system according to claim 17 wherein the overfill and ground monitoring system comprises a diode mounted on the vehicle and responsive to the fluctuating ground proving signal for returning to the monitoring terminal a rectified ground proving signal indicating that the vehicle is grounded and wherein the diode is responsive to the modified ground proving signals for returning modified ground proving signals indicating that the vehicle is grounded.

19. A tank truck vapor tightness certification verification system according to claim 18 wherein the memory comprises a read-only portion and a random access portion and wherein the serial number is permanently stored in the memory read-only portion.

20. A tank truck vapor tightness certification verification system according to claim 19 wherein the memory is responsive to the modified ground proving signals for returning the serial number to the verification system and the verification system compares the returned serial number to a list of verified serial numbers.

21. A tank truck vapor tightness certification verification system according to claim 20 wherein the memory contains an expiration date of the tank truck vapor tightness certification stored in the memory random access portion and the memory is responsive to read signals generated by the verification system for returning the expiration date to the verification system.

22. A tank truck vapor tightness certification verification system according to claim 21 wherein the verification system is responsive to the returned expiration date for comparing the returned expiration date to the current date to determine whether the vapor tightness certification has expired.

23. A tank truck vapor tightness certification verification system according to claim 19 wherein the memory is responsive to the read signals for returning the serial number to the verification system.

24. A tank truck vapor tightness certification verification system according to claim 23 wherein the verification system comprises apparatus responsive to a returned serial number for comparing the returned serial number to a list of serial numbers corresponding to tank trucks with unexpired vapor tightness certificates.

25. A method for identifying a vehicle for use with an overfill and grounding system having a multiwire cable for electrically connecting the vehicle to an over fill and ground monitoring terminal, the overfill and grounding system generating monitoring signals on the cable wires, the method comprising the steps of:

A) mounting on the vehicle a memory containing a unique serial number;

B) connecting identification apparatus between the overfill and ground monitoring terminal and the cable, the identification apparatus generating identification signals and modified monitoring signals;

C) when the vehicle is connected to an alternative monitoring terminal in which the identification apparatus is not present, isolating the memory from the cable in response to the monitoring signals; and D) when the vehicle is connected to the monitoring terminal in which the identification apparatus is present, connecting the memory to the cable to receive the identification signals in response to the modified monitoring signals.

26. A vehicle identification and ground verification system for a vehicle in electrical communication with a loading terminal via a single conductor, the identification system comprising:

a vehicle ID unit located on the vehicle and in contact with the conductor, the ID unit, in response to an ID acquisition signal on the conductor, providing an ID output on the conductor indicative of unique information which identifies the vehicle;

a vehicle ground proving device located on the vehicle and in contact with the conductor, the ground proving device detecting a ground monitoring signal on the conductor and outputting on the conductor a ground output indicative of the presence of a ground connection between the vehicle and the loading terminal;

a vehicle test apparatus on the loading terminal which generates the ground monitoring signal and the ID acquisition signal and outputs them on the conductor, the test apparatus detecting the ground output and the ID output and inhibiting a transfer of material from the loading terminal to the vehicle when the ground output indicates the absence of a ground connection between the vehicle and the loading terminal, the test apparatus also inhibiting a transfer of material from the loading terminal to the vehicle when the unique information indicated by the ID output does not correspond to that of an authorized vehicle.

27. A vehicle identification system according to claim 26 wherein the vehicle ID unit further comprises a voltage protection apparatus which isolates the ID unit from an overvoltage condition.

28. A vehicle identification system according to claim 26 wherein the ground monitoring signal is a first ground monitoring signal and wherein the vehicle ground proving device is responsive to a second ground monitoring signal which is output by a loading terminal not equipped with said vehicle identification system.

29. A vehicle identification system according to claim 26 wherein the vehicle ID unit comprises a memory device to which information may be written by the vehicle test apparatus.

30. A vehicle identification system according to claim 26 further comprising an overfill protection device which inhibits a transfer of material from the loading terminal to the vehicle when a storage container of the vehicle is above a predetermined capacity, the overfill protection device comprising a container level sensor which outputs an overfill signal when material in the container is beyond the predetermined capacity, and a transfer cutoff device that receives the overfill signal and inhibits a transfer of material in response thereto.

31. A vehicle identification system according to claim 30 wherein the vehicle test apparatus inhibits a transfer of material from the loading terminal to the vehicle by simulating an overfill signal which is input to the overfill protection device.

* * * * *